United States Patent Office 3,565,866
Patented Feb. 23, 1971

3,565,866
CONTINUOUS POLYMERIZATION OF LACTAMS
Ernst Guenther, Ludwigshafen, Hermann Linge, Carlberg, Kurt Noé, Ludwigshafen, and Hans Pirzer, Frankenthal, Germany, assignors to Badische Anilin- & Soda-Fabrik Aktiengesellschaft, Ludwigshafen (Rhine), Germany
Continuation-in-part of application Ser. No. 485,200, Sept. 7, 1965. This application Nov. 5, 1968, Ser. No. 773,376
Claims priority, application Germany, Sept, 17, 1964, P 14 95 198.5
Int. Cl. C08g 20/14
U.S. Cl. 260—78
2 Claims

ABSTRACT OF THE DISCLOSURE

An improved process for the continuous polymerization of lactams having 5 to 13 ring members in a polymerization tube in which process the lactams are prepolymerized in the first zone of a modified polymerization tube with vigorous stirring up to a conversion of more than 50%, further polymerized in the second and third zones at nearly laminar flow and after-polymerized in the fourth zone at a temperature slightly above the melting point of the resultant polymer.

Figure 1:
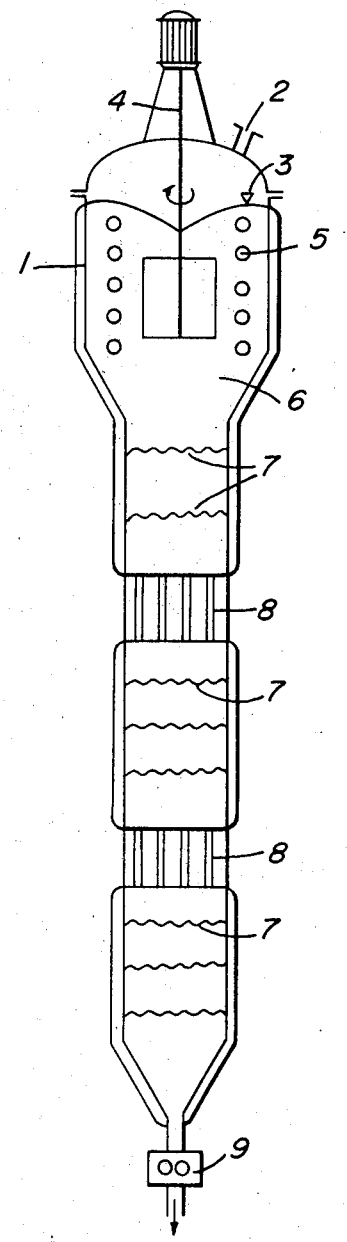
Figure 2:
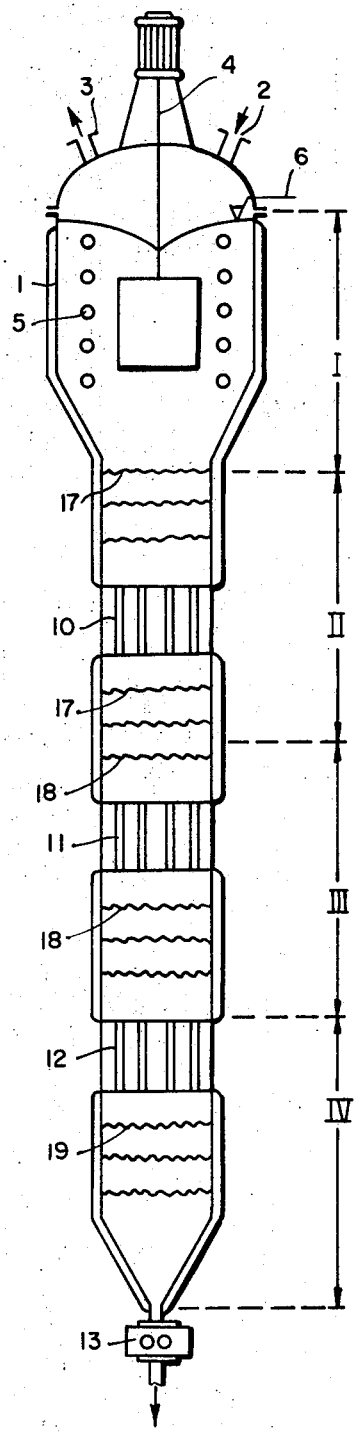

This application is a continuation-in-part of application Ser. No. 485,200 filed on Sept. 7, 1965, now abandoned.

This invention relates to a process for the continuous polymerization of lactams at elevated temperature, polymerization being carried out mainly in the upper fourth part of a modified polymerization tube with vigorous stirring. Polymerization is then continued in two downstream zones each of which makes up about a quarter of the volume of the reaction tube and completed in the lower fourth part of the polymerization tube at a temperature slightly above the melting point of the polylactam formed.

It is known that polyamides may be prepared by polymerization at atmospheric pressure of lactams, such as caprolactam, at elevated temperature, for example at from 240° to 275° C., in polymerization tubes, so-called VK-tubes (the abbreviation VK standing for "Vereinfachtes Kontinuierliches Verfahren," i.e., Simplified Continuous Process; cf. H. Hopff, A. Müller, F. Wenger, "Die Polyamide," 1954, pp. 24 and 282), which may be subdivided into zones. It is also known that the lactam melt may be kept at the polymerization temperature in the first reaction zone. It is difficult to control the temperature of the reaction mixture in such methods, particularly when VK-tubes having a large diameter are used. Delay in boiling, caused by vapor, often occurs and results in sudden bubbling of the reaction mixture and consequently in stoppages in the pipes. Moreover, fractionation apparatus is often necessary to recover the lactam vaporizing with the water, and furthermore VK-tubes of the conventional design occupy rather a large space.

A process for the continuous polymerization of lactams has therefore been proposed in which ω-lactams together with the melt of a high molecular weight linear polyamide ($[\eta]\geq0.4$ in m-cresol) without any other additives, such as catalysts, regulators, etc., are introduced into the upper heated reaction zone; the water content of the reaction mixture should not exceed 1 mole of water to 50 moles of lactam (with reference to caprolactam this corresponds to an amount of not more than 0.32% by weight of water) (U.S. Pat. 2,562,796).

According to this U.S. patent the water content of the monomers in the upper zone is brought up to 1% by the addition of steam. The polymerization mixture enters a second central zone of the reactor whose temperature is higher than that of the upper zone. Part of the reaction mixture is returned from this zone by means of a pump to the upper zone via a recycle line. The reaction mixture passes from the central zone into a third lower zone whose temperature is preferably between that of the upper zone and that of the central zone. The resultant polymer is then continuously discharged from the lower zone.

It is true that this process represents an advance over earlier methods, but it still has big disadvantages, for example polymerization starts relatively slowly at a water content of only 0.3%. Although the reaction can be accelerated by increasing the water content to about 1% by weight by the addition of steam, the method of introducing the water is rather inaccurate so that a constant water content and consequently a uniform degree of polymerization of the polylactam cannot be set up. Since in this process the use of a chain terminator in particular is categorically ruled out and only caprolactam and water are used, polymers can only be obtained which have poor spinning properties because in dependence on the temperature used and the design of the spinning apparatus uncontrolled after-polymerization, i.e. an increase in the viscosity, occurs during the spinning process. Moreover, the monomer is mixed with the prepolymer by means of a recycle line and a pump. This complicated way of effecting mixing is not adequate in the case of the viscosities concerned to obtain a uniform polymer. Furthermore, air can easily enter the melt through the beaks which are always present when pumps having the necessary high capacity are used, which results in oxidative damage to and discoloration of the polymers.

We have now found that the said disadvantages in the continuous polymerization of a monomeric lactam having 5–13 ring members in a vertical polymerization tube which comprises continuously adding said monomeric lactam in the molten state to a lactam prepolymer in the upper fourth part of said tube at a rate sufficient to maintain a substanially constant level of the lactam-prepolymer mixture in said part, can be avoided by maintaining in said part, which has a diameter 30 to 80% greater than the diameter of the remainder of said tube, the monomeric lactam lactam-prepolymer mixture in the presence of up to 15% by weight of water at a polymerization temperature of 240–280° C. at atmospheric pressure with stirring of said mixture to polymerize the added monomeric lactam into additional lactam prepolymer for a period of time sufficient to carry out the polymerization mainly in said part by maintaining said mixture in said part for a mean residence time of several hours, said lactam prepolymer in said upper fourth part thereby having a degree of polymerization resulting from polymerization for said period of time, continuously passing the prepolymer formed in said part downwardly therefrom into the middle portion of said tube and herein continuing the polymerization at 240–280° C., continuously passing the resultant polylactam into the lower quarter part of said tube and after-polymerizing the resultant polylactam at a temperature slightly above the melting point of the polylactam in said last-mentioned part, and continuously discharging the melt of said polylactam from the lower end of said tube.

According to this invention lactams containing larger amounts of water, e.g. up to about 15%, may also be polymerized, whereas it is only possible by conventional methods to polymerize lactam melts having a maximum water content of 7%. It is also possible to disperse pigments, catalysts, regulators, master batches, fillers, stabilizers and other conventional additives in conventional amounts more finely in the polyamides than is possible in prior art methods. In particular the process according to this invention makes it possible for pigments in aqueous suspension to be introduced into the upper zone of the polymerization tube without disturbing the polymerization reaction. The delay in boiling, which in conventional VK-tubes, especially when polymerizing lactams having high water contents, results in serious disturbances by boiling over in the early stages, can be avoided. The process according to this invention offers special advantages in the production of polyamides having a high pigment or filler content.

In the process according to the invention conventional compounds are used as regulators, e.g. aliphatic or aromatic monocarboxylic acids, such as acetic acid, propionic acid, stearic acid and benzoic acid, aliphatic dicarboxylic acids, such as adipic acid and sebacic acid, aliphatic amines having 3 to 8 carbon atoms, such as propylamine, butylamine, isobutylamine and hexylamine, or aliphatic diamines having 2 to 8 carbon atoms, such as ethylenediamines, hexamethylenediamine and octamethylenediamine. The regulators are used in conventional amounts, i.e. from 0.05 to 2 mol percent, preferably from 0.1 to 0.5 mol percent, with reference to the lactam.

The process according to the invention is advantageously carried out by passing the lactam melt together with the regulator and, if desired any other conventional additive from above into the upper zone of the reactor of a vertical modified VK-tube which corresponds to the uppermost fourth part of said VK-tube and in which stirring means is provided until the stirring means partly dips into the melt; the upper zone with the stirring means will hereinafter be referred to as the stirring attachment. Turbulent flow is then imparted to the melt by stirring and the melt is heated to polymerization temperature (about 240° to 280° C.). Further lactam melt is supplied during the heating-up period until the normal level in the modified VK-tube has been reached. When the desired degree of polymerization has been set up, polyamide melt is continuously discharged at the lower end of the VK-tube. The level of the melt in the VK-tube is kept practically constant by adding more starting material at the same time. It is preferred to keep the water content of the lactam supplied to the reaction tube constant. It is thus possible after continuous polymerization has started to keep the chosen conditions, namely the stirring intensity, the heating of zone I and the heating or cooling of zones II, III and IV, practically unchanged for long periods of time, e.g. for several years. In this way polymers of exceptional and constant quality are obtained. However, the process according to this invention also enables lactam batches of greatly differing water content to be polymerized provided that the water content does not greatly exceed 15% by weight for a prolonged period of time. The stirring intensity and the different heating and cooling means must be correlated to the water content of the lactam and to the type and amount of the regulator used, which can easily be carried out by checking the relative viscosity or the degree of polymerization of the reaction mixture in the individual zones.

The freshly supplied lactam, preferably in the form of a melt, is intensely mixed in the first zone with the polymerizing reaction mixture contained therein. The reaction heat liberated during polymerization is utilized to heat up the lactam melt supplied. The temperature in the stirring attachment is from 240° to 280° C., preferably from 245° to 255° C. The vigorous movement of the stirred melt results in very good degassing. In this way the reacting mixture of monomer and prepolymer is brought, with uniform evaporation of water, to a water content of 0.1 to 3%, preferably from 0.15 to 0.25%, with reference to the total weight of the reaction mixture. The lactam is simultaneously polymerized up to a degree of conversion of about 55–65%. The relative viscosity serviced without the need for opening the cover of the of the polymerizing reaction mixture rises to 1.1 to 1.6, preferably 1.25 to 1.35.

The reaction mixture passes continuously from the uppermost zone (the stirring attachment) into the second zone where the turbulent flow is converted into an almost laminar one and the reaction mixture is kept at a temperature of from 240° to 280° C., preferably from 255° to 265° C.

While retaining the almost laminar flow the reaction mixture passes from the second into the third zone where it is also kept at a temperature of from 240° to 280° C., preferably from 255° to 265° C. When the reaction mixture passes from the third into the fourth lowest zone of the reactor, the lactam has been converted to the extent of 80 to 90%. At this point the relative viscosity of the reaction mixture is about 2.0 to 2.55, preferably 2.1 to 2.4. The reaction mixture, upon entering the fourth zone of the reactor, is cooled to a temperature slightly higher than, i.e. 1° to 25° C., preferably 1° to 10° C., above, the setting point of the polymer formed. While substantially retaining a laminar flow, after-polymerization is effected in this zone until a conversion of more than 90%, preferably 91–93%, is achieved. The polymer now has a relative viscosity of from 2.1 to 2.8, preferably from 2.1 to 2.6. The molten polymer is then continuously discharged at the lower end of the reactor.

The residence time of the reaction mixture in the individual zones is about the same. In general it is from 3 to 9 hours, preferably from 4 to 6 hours, per zone.

Particularly suitable apparatus for carrying out the process according to this invention is a polymerization tube (modified VK-tube) capable of being heated and cooled and preferably cylindrical in shape, the uppermost forth part of which, i.e. the stirring attachment, has a larger diameter than the remainder and in which there are provided: heating and stirring means in the stirring attachment, means for achieving a uniform flow profile and means for reversible heat-exchange in the remainder of the tube. The modified VK-tube used according to this invention is not as high as conventional VK-tubes and therefore occupies less space.

A suitable embodiment of apparatus is shown by way of example in the accompanying drawing 1.

A cylindrical tube 1 of alloyed steel has a diameter in the stirring attachment 6 which is greater by 30 to 80%, preferably by 40 to 60%, than the remaining portion of the tube. 2 is the feed line for the polymerizable lactam melt the level of which is regulated by regulating means 3 which stops the supply if necessary. 4 is a stirring means for mixing the reaction material in the uppermost fourth part of the tube 1. 5 is a means for heating the reaction material. 7 are means for achieving a uniform flow profile of the reaction material. 8 are means for reversible heat exchange and 9 is a means for the continuous discharge of polyamide.

A preferred embodiment of apparatus is shown in the accompanying drawing 2.

The reactor consists of a stainless steel cylindrical tube 1 which is divided into four zones (I to IV). The uppermost zone, i.e. the stirring attachment (I), whose diameter is larger by 30 to 80%, preferably by 40 to 60%, than the remaining portion of the tube, is provided with a feed line 2, a degassing line 3, stirring means 4 and means 5 for heating the reaction material. The level of the reaction mixture is regulated by regulating means 6 which stops the supply if necessary.

Means 17, 18 and 19 for achieving a uniform flow profile of the reaction material and means 10, 11 and 12 for reversible heat exchange are arranged in zones II, III and IV of the reaction tube. Means 13 for the continuous discharge of the polyamide formed is provided at the lower end of the reactor.

Stirring means of conventional design are suitable, particularly stirrers whose bearings and bushings can be modified VK-tube. Heating coils are particularly suitable as heating means because they hinder the mixing effect least. Suitable means for achieving a uniform flow profile are for example conventional grates or perforated plates, while examples of suitable means for reversible heat exchange are tube bundles or ribbed pipes. The polymer melt can be discharged by conventional means, e.g. by means of a gear pump or screw.

The invention is illustrated by the following examples.

EXAMPLE 1

125 kg. per hour of molten caprolactam containing 0.5% by weight of water and 0.15% by weight of glacial acetic acid (100%) is pumped into polymerization apparatus in the form of a reaction tube whose volume up to the level of liquid is 3 m.$^3$ and which is divided into four zones as shown in the drawing. The stirrer arranged in the uppermost zone which constitutes about a quarter of the volume of liquid in the reaction tube rotates at 50 r.p.m. The temperature is adjusted to 250° C. by means of a heating coil. The water in the melt evaporates down to a content of 0.15% by weight, this content remaining in the melt as it passes through the other portions of the reaction tube. The reaction proceeds in the upper portion of the reaction tube to a conversion of about 60%. The reaction mixture, upon entering the second zone, has a relative viscosity of about 1.35.

In the second zone the turbulent flow of the reaction mixture is converted into an almost laminar one by the built-in means for achieving a uniform flow profile. As a result of the reaction heat which is liberated the temperature there rises to 260° C. The temperature is kept at this level by means of the built-in heat exchanger. The reaction mixture enters the third zone at this temperature where polymerization proceeds to a conversion of 87%. The viscosity rises to $\eta = 2.41$. The residence times in the second and third zones, when added together, constitute half of the total reaction time of about 24 hours. The temperature of the reaction mixture upon entry into the fourth reaction zone is lowered to 235° C. by means of a heat exchanger. The polymer passes through this zone to the discharge means (a gear pump) in the course of 6 hours. The conversion rises to 92.5% and the relative viscosity to 2.63.

The pump continuously discharges 125 kg. of polymer from the lower end of the reaction tube. The resultant product is very light in color (APHA number=9).

After removal, cooling and granulation the polymer can be further processed in a conventional manner and used for injection molding or spinning purposes.

EXAMPLE 2

In accordance with Example 1 140 kg. per hour of molten caprolactam containing 0.21% by weight of glacial acetic acid (100%) is pumped into the reaction tube. At the same time 20.4 kg. per hour of an aqueous suspension containing 10% by weight of titanium dioxide in finely divided form is metered into the same inlet. The temperature while stirring (60 r.p.m.) is kept at 245° C. In the stirring attachment the water evaporates down to a residual content of 0.17% by weight. The conversion in this zone of the reactor is 57.5%; the relative viscosity is 1.1.

The temperature in the second and third zones is adjusted to 257° C. the conversion is about 88%, the relative viscosity 2.1.

The temperature is adjusted to 235° C. in the fourth zone and a polymer having a relative viscosity of 2.15, 8% by weight of extractables (corresponding to a conversion of 92%) and a TiO$_2$ content (with reference to polymer free from extractables) of 1.46% by weight. The polymer is outstandingly suitable for spinning purposes.

When the above procedure is followed using a polymerization tube whose upper portion does not have a larger diameter than the remaining portion and which is not provided with stirring means but with a recycle line through which the polymerizing melt is pumped, violent bubbling up of the reaction mixture brought about by the delay in boiling occurs. This results in clogging of the degassing line and consequently disturbs continuous polymerization. Moreover, the filling height of the reaction tube cannot be kept constant. As a result, considerable variations in the viscosity of the polymer formed occur. Pigmented polymers obtained by this method are not suitable for spinning purposes.

EXAMPLE 3

The procedure of Example 2 is followed, but a solid master batch containing 20% by weight of TiO$_2$ in finely divided form in polycaprolactam is used instead of the aqueous suspension. 11 kg. per hour of this master batch is metered at a uniform rate into the uppermost zone of the reaction tube and 140 kg. per hour of caprolactam melt containing 2.1% by weight of water and 0.17% by weight of glacial acetic acid (100%) is added. The solid granules are dissolved in the reaction mixture and the titanium dioxide is homogeneously dispersed by stirring (50 r.p.m.) at 245° C.

Under the temperature conditions given in Example 2 151 kg. per hour of a polymer having the following specification is obtained:

Content of extractables=7% by weight (corresponding to a conversion of 93%);
Relative viscosity=2.25;
TiO$_2$ content (with reference to polymer free from extractables)=1.46% by weight.

The resultant polycaprolactam is particularly suitable for the production of dull yarns.

We claim:

1. A process for continuous polymerization of a monomeric lactam having 5–13 ring members in a tubular polymerization zone which comprises continuously adding said monomeric lactam containing up to 15% water in the molten state to a lactam prepolymer in the upper part of said zone at a rate sufficient to maintain a substantially constant level of the lactam-prepolymer mixture in said upper part, providing a diameter for said upper part which is 30 to 80% greater than the diameter of the remainder of said zone, maintaining in said upper part for a mean residence time of 3–9 hours the monomeric lactam lactam-prepolymer mixture at a polymerization temperature of 240–280° C. at atmospheric pressure with stirring of said mixture to provide turbulent flow thereof and to polymerize the added monomeric lactam into additional lactam prepolymer, the water content of said lactam-prepolymer mixture in said upper part being maintained at 0.1 to 3% by weight of the mixture therein, the relative viscosity of said mixture in said upper part being raised to 1.1 to 1.6, and the degree of polymerization of said prepolymer in said upper part is about 55–65% of the overall, resultant polymerization, continuously passing the prepolymer formed in said upper part downwardly therefrom into the middle portion of said zone and therein continuing the polymerization at 240–280° C., continuously passing the resultant polylactam into the lower part of said zone and after-polymerizing the resultant polylactam at a temperature slightly above the melting point of the polylactam in said last-mentioned part, the flow of the polylactam in said middle portion and said lower part of said zone being a substantially laminar flow, the relative viscosity of the polylactam in said middle portion being raised to 2.0 to 2.55, the relative viscosity of the polylactam in said lower part being 2.1 to 2.8 with a degree of polymerization of more than 90% being reached in said lower part, and continuously discharging the melt of said polylactam from the lower end of said zone.

2. A process as claimed in claim 1 wherein said lactam is ε-caprolactam.

References Cited

UNITED STATES PATENTS

| | | | |
|---|---|---|---|
| 2,562,796 | 7/1951 | Koch | 260—78 |
| 3,171,829 | 3/1965 | Wiesner et al. | 260—78 |
| 3,368,874 | 2/1968 | Ludewig | 260—78X |

WILLIAM H. SHORT, Primary Examiner

L. M. PHYNES, Assistant Examiner